United States Patent
Lin

(10) Patent No.: US 9,508,128 B1
(45) Date of Patent: Nov. 29, 2016

(54) IMAGE-CORRECTION SYSTEM AND METHOD

(71) Applicant: Silicon Optronics, Inc., Hsinchu (TW)

(72) Inventor: Chun-Hung Lin, Hsinchu (TW)

(73) Assignee: SILICON OPTRONICS, INC., Hsinchu (TW)

( * ) Notice: Subject to any disclaimer, the term of this patent is extended or adjusted under 35 U.S.C. 154(b) by 0 days.

(21) Appl. No.: 14/832,818

(22) Filed: Aug. 21, 2015

(30) Foreign Application Priority Data

May 19, 2015 (TW) .............................. 104115842 A

(51) Int. Cl.
*G06T 5/00* (2006.01)
(52) U.S. Cl.
CPC .................... *G06T 5/002* (2013.01)
(58) Field of Classification Search
CPC .................................................. G06T 5/002
See application file for complete search history.

(56) References Cited

U.S. PATENT DOCUMENTS

| 2014/0193093 A1* | 7/2014 | Rao ......................... G06T 5/002 382/261 |
| 2015/0016720 A1* | 1/2015 | Vermeir ..................... G06T 5/20 382/166 |

FOREIGN PATENT DOCUMENTS

| FR | EP 2851867 A2 * | 3/2015 | ............... G06T 5/20 |
| FR | EP 2887309 A1 * | 6/2015 | ............... G06T 5/20 |
| SG | WO 2014168587 A1 * | 10/2014 | ............ G06T 5/002 |
| TW | 200828984 A | 7/2008 | |

OTHER PUBLICATIONS

He, K. et al.: 'Guided Image Filtering' Proceedings, Part I, Lecture Notes in Computer Science Nov. 5, 2010, Computer Vision—ECCV 2010, 11th European Conference on Computer Vision, Heraklion, Crete, Greece.*

* cited by examiner

*Primary Examiner* — Sean Motsinger
(74) *Attorney, Agent, or Firm* — Muncy, Geissler, Olds & Lowe PC

(57) ABSTRACT

The present invention provides an image-correction system, including an image-capture module, a first calculation module, a second calculation module and an output module. The image-capture module obtains an input image and a guide image. The first calculation module obtains a first correction image according to a first parameter and a second parameter, obtains the first parameter according to the mean value of the guide image, a variance value of the guide image, a mean value of the input image and a smooth function, and obtains the second parameter according to the first parameter, the mean value of the guide image and the mean value of the input image. The second calculation module obtains the ratio value of the mean value of the guide image and the variance value of the guide image. The output module outputs the first correction image.

14 Claims, 7 Drawing Sheets

| 226 | 242 | 242 | 198 | 238 | 234 | 222 | 238 | 230 | 166 | 234 |
|-----|-----|-----|-----|-----|-----|-----|-----|-----|-----|-----|
| 230 | 218 | 238 | 234 | 218 | 202 | 230 | 238 | 266 | 234 | 214 |
| 234 | 238 | 262 | 226 | 226 | 242 | 242 | 250 | 238 | 222 | 230 |
| 274 | 226 | 198 | 262 | 206 | 258 | 262 | 258 | 206 | 274 | 198 |
| 270 | 218 | 238 | 206 | 238 | 210 | 262 | 258 | 246 | 230 | 182 |
| 254 | 242 | 198 | 262 | 202 | 1022 | 230 | 246 | 250 | 186 | 218 |
| 254 | 250 | 242 | 218 | 214 | 210 | 190 | 286 | 222 | 218 | 250 |
| 234 | 266 | 234 | 242 | 258 | 190 | 218 | 246 | 210 | 246 | 250 |
| 238 | 218 | 258 | 214 | 258 | 202 | 222 | 266 | 238 | 230 | 198 |
| 202 | 254 | 246 | 182 | 242 | 206 | 266 | 278 | 246 | 290 | 210 |
| 262 | 246 | 254 | 210 | 234 | 238 | 270 | 290 | 270 | 270 | 238 |

FIG. 3A

| 0.843 | 0.141 | 0.704 | 0.936 | 0.856 | 1.165 | 1.025 | 0.216 | 0.540 |
|---|---|---|---|---|---|---|---|---|
| 1.885 | 1.298 | 1.688 | 1.714 | 1.719 | 1.641 | 1.253 | 0.506 | 1.256 |
| 2.666 | 1.773 | 1.615 | 1.592 | 1.507 | 0.330 | 0.248 | 0.233 | 1.393 |
| 2.122 | 1.634 | 1.734 | 1.437 | 1.646 | 1.344 | 0.981 | 0.201 | 1.120 |
| 2.342 | 2.438 | 2.481 | 1.982 | 2.332 | 1.951 | 1.372 | 0.015 | 1.579 |
| 2.865 | 2.939 | 196.12 | 250.28 | 192.80 | 225.52 | 177.96 | 0.520 | 1.203 |
| 2.470 | 2.656 | 249.46 | 291.34 | 243.57 | 270.93 | 228.84 | 0.622 | 0.421 |
| 1.872 | 1.926 | 206.53 | 259.41 | 207.37 | 253.49 | 190.70 | 3.661 | 2.703 |
| 2.285 | 2.303 | 252.17 | 301.09 | 266.64 | 299.82 | 240.34 | 4.974 | 3.604 |
| 2.086 | 2.215 | 202.35 | 260.32 | 213.54 | 268.90 | 200.53 | 3.655 | 2.940 |
| 0.964 | 1.386 | 2.210 | 2.825 | 2.435 | 0.752 | 5.126 | 5.357 | 4.073 |
| 1.308 | 1.618 | 2.341 | 3.171 | 2.609 | 0.764 | 4.483 | 4.280 | 3.306 |
| 1.087 | 1.329 | 3.159 | 4.312 | 2.959 | 0.788 | 2.922 | 1.579 | 1.540 |
| 2.350 | 3.132 | 3.377 | 3.374 | 2.991 | 2.685 | 3.942 | 2.083 | 2.045 |
| 3.186 | 3.732 | 2.979 | 2.480 | 2.582 | 2.875 | 3.972 | 1.767 | 1.449 |

FIG. 3B

IMAGE-CORRECTION SYSTEM AND METHOD

CROSS REFERENCE TO RELATED APPLICATIONS

This Application claims priority of Taiwan Patent Application No. 104115842, filed on May 19, 2015, the entirety of which is incorporated by reference herein.

BACKGROUND OF THE INVENTION

Field of the Invention

The disclosure generally relates to an image-correction system and an image correction method, and in particular, to an image-correction system and an image correction method which are used for correcting an image according to the ratio value of a mean value and a variance value of the image.

Description of the Related Art

With developments constantly being made in the imaging industry, image sensors have come to be used widely in digital cameras. In the pursuit of better image quality, the requirements for image processing by the image sensor are also increasing. Image sensors in cameras must be able to remove noise, removing cross-talk, and correct defect in the sensor. With conventional technology, retaining detail and removing noise cannot be taken into account when removing cross-talk. This means that when an image has more detail, it might also have more noise. Otherwise, the lower the noise level, the lower the detail. Moreover, the gain of an image and its exposure time might affect the detection of defective pixels. Thus, how to improve the efficiency of image processing while maintaining the cost-effectiveness of a device is a current problem that needs to be solved.

BRIEF SUMMARY OF THE INVENTION

In order to solve the aforementioned problem, an embodiment of the invention provides an image-correction system, including an image-capture module, a first calculation module, a second calculation module and an output module. The image-capture module obtains an input image and a guide image. The first calculation module obtains a first correction image according to a first parameter and a second parameter. The first calculation module also obtains a smooth function according to a ratio value and a mean value of the guide image, obtains the first parameter according to the mean value of the guide image, a variance value of the guide image, a mean value of the input image and the smooth function, and obtains the second parameter according to the first parameter, the mean value of the guide image and the mean value of the input image. The second calculation module obtains the ratio value of the mean value and the variance value according to the mean value of the guide image and the variance value of the guide image. The output module outputs the first correction image.

Another embodiment of the invention provides an image correction method, including: obtaining an input image and a guide image; obtaining a ratio value of a mean value of the guide image and a variance value of the guide image according to the mean value of the guide image and the variance value of the guide image; obtaining a smooth function according to the ratio value and the mean value of the guide image; obtaining a first parameter according to the mean value of the guide image, the variance value of the guide image, a mean value of the input image and the smooth function; obtaining a second parameter according to the first parameter, the mean value of the guide image and the mean value of the input image; obtaining a guide filter function according to the first parameter and the second parameter; and obtaining a first correction image according to the guide filter function

BRIEF DESCRIPTION OF DRAWINGS

The invention can be more fully understood by reading the subsequent detailed description and examples with references made to the accompanying drawings, wherein:

FIGS. 3A, 3B are schematic drawings of the defective pixel in accordance with an embodiment of the invention:

DETAILED DESCRIPTION OF THE INVENTION

Further areas in which the present devices and methods can be applied will become apparent from the following detailed description. It should be understood that the detailed description and specific examples, while indicating exemplary embodiments of the image-correction systems and the image correction devices, are intended for the purposes of illustration only and are not intended to limit the scope of the invention.

Figure 1:
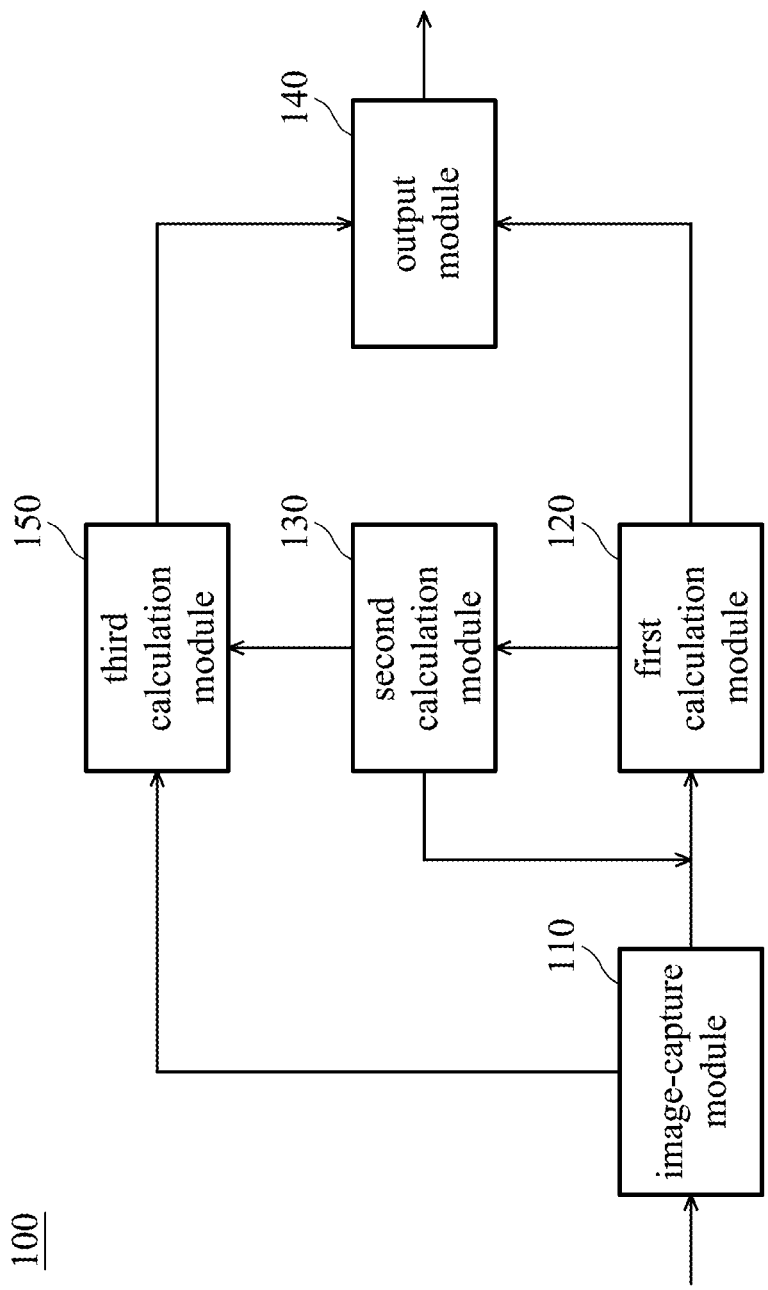
FIG. 1 is a block diagram of the image-correction system in accordance with an embodiment of the invention.

FIG. 1 is a block diagram of the image-correction system in accordance with an embodiment of the invention. The image-correction system 100 includes an image-capture module 110, a first calculation module 120, a second calculation module 130 and an output module 140. The image-capture module 110 obtains an input image p and a guide image I. The guide image I can be a default image, a brighter input image p' which has more details than the input image p, or the input image p. After the image-capture module 110 obtains the input image p and the guide image I, the first calculation module 120 obtains a mean value $\bar{I}$ and a variance value $\sigma^2$ corresponding to a filtering window w of the guide image I, and outputs the mean value $\bar{I}$ and the variance value $\sigma^2$ to the second calculation module 130. The variance value $\sigma^2$ refers to the distance between a random number and its expected value. The second calculation module 130 obtains a ratio value ($\sigma^2/\bar{I}$) of the mean value $\bar{I}$ and the variance value $\sigma^2$ according to the parameters, and outputs the ratio value ($\sigma^2/\bar{I}$) back to the first calculation module 120.

Figure 2A:
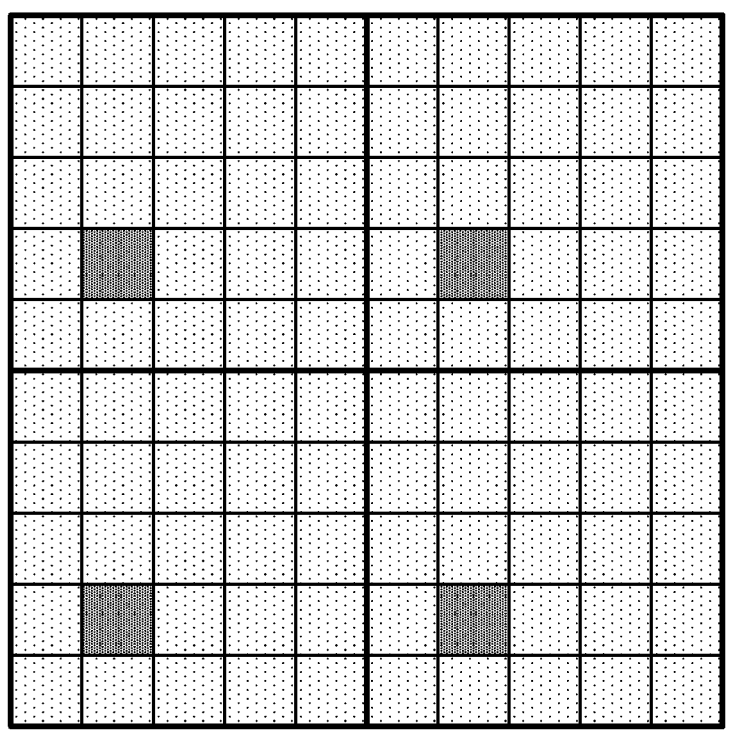
FIGS. 2A, 2B, 2C are schematic drawings of the pixel distribution in accordance with some embodiments of the invention.
Figure 2B:
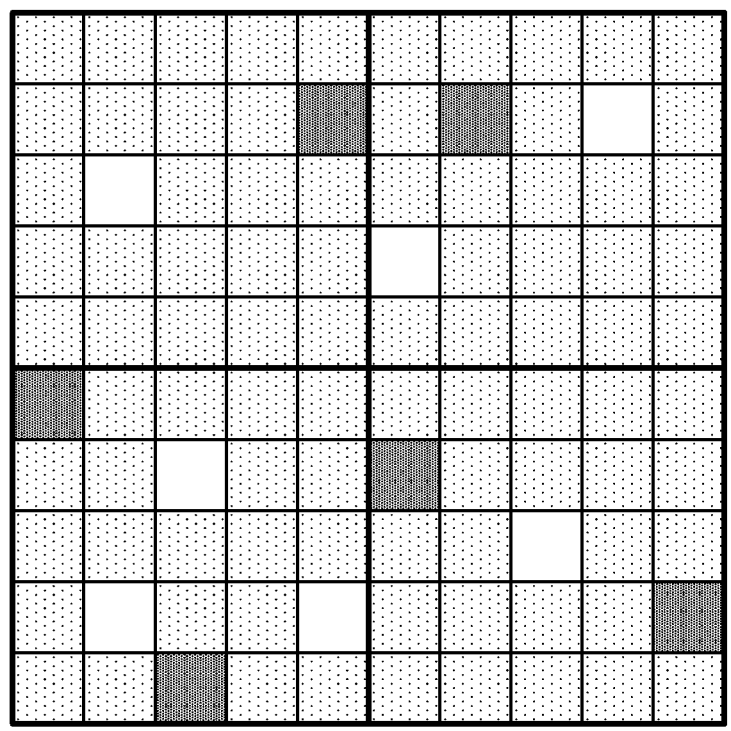
Figure 2C:
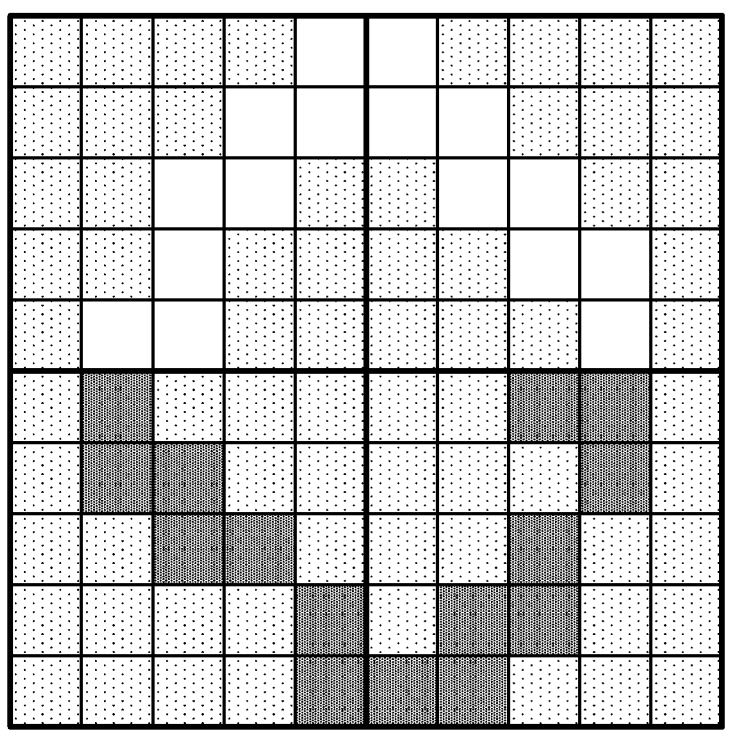

The distribution of the pixel value can be obtained according to the mean value and the variance value of the image, and thus the details of the image can be obtained by calculating the ratio value of the mean value and the variance value. For example. FIGS. 2A, 2B, 2C are schematic drawings of the pixel distribution in accordance with some embodiments of the invention. When the pixel distribution of the area is smooth, such as the area shown in FIG. 2A, there are only four dark blocks randomly distributed in the area, referring to the image having little noise or few details. The ratio value of the mean value $\bar{I}$ and the variance value $\sigma^2$ calculated by the second calculation module 130 is about 0. When the pixel distribution of the area is random distribution, such as the white blocks and the dark blocks shown in FIG. 2B, they are randomly distributed in the area, meaning refers that the image has some noises or some details. The ratio value of the mean value $\bar{I}$ and the variance value $\sigma^2$ calculated by the second calculation module 130 is about 1. When the pixel distribution of the area shows that there are obvious clusters distributed in the area, such as the white blocks and the dark blocks shown in FIG. 2C, they are clustered in the area, meaning that the image has edges or more detail. The ratio value of the mean value $\bar{I}$ and the variance value $\sigma^2$ calculated by the second calculation module 130 is much greater than 1.

The first calculation module 120 calculates the smooth function $f(k)$ according to the ratio value and the mean value $\bar{I}$ of the guide image I. The formula for obtaining the smooth function $f(k)$ is shown as follows:

$$f(k) = \begin{cases} \left(c1 - h\left(\frac{\sigma_k^2}{\bar{I}_k}\right)\right) \times (c2 + q(\bar{I}_k)), & c1 \geq h\left(\frac{\sigma_k^2}{\bar{I}_k}\right) \\ 0, & c1 < h\left(\frac{\sigma_k^2}{\bar{I}_k}\right) \end{cases}$$

wherein, $$\left(c1 - h\left(\frac{\sigma_k^2}{\bar{I}_k}\right)\right)$$

is a variance factor, $$(c2 + q(\bar{I}_k))$$

is a mean factor, c1 and c2 are constants, and k refers to the $k^{th}$ filtering window.

After the first calculation module 120 obtains the smooth function $f(k)$, the first calculation module 120 also obtains the first parameter $a_k$ according to the mean value $\bar{I}$ of the guide image I, a variance value $\sigma^2$ of the guide image I, a mean value $\bar{P}$ of the input image p, and the smooth function $f(k)$, and obtains the second parameter $b_k$ according to the first parameter $a_k$, the mean value $\bar{I}$ of the guide image I and the mean value $\bar{P}$ of the input image p. The formulas for obtaining the first parameter $a_k$ and the second parameter $b_k$ are shown as follows:

$$a_k = \frac{\frac{1}{|w|} \sum_{i \in w_k} I_i p_i - \bar{I}_k \bar{p}_k}{\sigma_k^2 + f(k)}$$

$$b_k = \bar{p}_k - a_k \bar{I}_k$$

wherein, $w_k$ is the $k^{th}$ filtering window, $|w|$ is number of pixels of the $k^{th}$ filtering window, $I_i$ is the $i^{th}$ pixel of the guide image I, $p_i$ is the $i^{th}$ pixel of the input image p, $\bar{I}_k$ is the mean value of the $k^{th}$ filtering window of the guide image I, $\bar{p}_k$ is the mean value of the $k^{th}$ filtering window of the input image p, $\sigma_k^2$ is the variance value of the $k^{th}$ filtering window of the guide image I.

After the first calculation module 120 obtains the first parameter $a_k$ and the second parameter $b_k$, the first calculation module 120 further obtains a first correction image $q_i$ according to the first parameter $a_k$ and the second parameter $b_k$. The formula for obtaining the first correction image $q_i$ is shown as follows:

$$q_i = a_k I_i + b_k$$

wherein, $q_i$ is the first correction image.

Due to the details of the image being related to the variance factor calculated according to the mean value $\bar{I}$ and the variance value $\sigma^2$ of the image, the smooth function $f(k)$ determines the blurriness of the flattest area, i.e., $$h\left(\frac{\sigma_k^2}{\bar{I}_k}\right) = 0,$$

by adjusting the value of c1. When the image becomes more blurred, the area becomes flatter, and the difference between pixels is also smaller. Moreover, the user determines the amount of detail by adjusting the value of c1, such as when $$h\left(\frac{\sigma_k^2}{\bar{I}_k}\right)$$

is greater than c1, the smooth function $f(k)$ is 0, and the first calculation module 120 keeps the details of the image entirely.

Due to the brightness of the image being related to the mean value $\bar{I}$ of the mean factor, the smooth function f(k) determines the blurriness of all of the image blocks by adjusting the value of c2, which means that when the value of c2 is greater, all of the image blocks become more blurred. However, when the brightness of the blocks are the same, the greater the value of c2, the smaller the first parameter $a_k$, and the larger the second parameter $b_k$. When the first correction image $q_i$ is close to the mean value of the input image p, which means that the first correction image $q_i$ has more details of the input image $q_i$. Otherwise, the smaller the value of c2, the larger the first parameter $a_k$, and the smaller the second parameter $b_k$. The first correction image $q_i$ has more details of the guide image I. Moreover, when $q(\bar{I}_k)$ is a maximal value, i.e. the brightest area of the image, the first parameter $a_k$ is close to 0, and the second parameter $b_k$ is equal to the mean value $\bar{p}$ of the input image p, such that the cross-talk of the image can be removed.

As described above, the user determines the amount of the details he/she wants to keep by adjusting the value of c1, and determines the blurriness of the areas with different brightness by adjusting the value of c2.

According to another embodiment of the invention, the image-correction system 100 also includes a third calculation module 150, configured to determine whether the image has a defective pixel according to the ratio values of the mean value $\bar{I}$ and the variance value $\sigma^2$ of a plurality of pixels within the predetermined area. The defective pixel means the pixel value of the center pixel has an obvious difference with the pixel values of adjacent pixels. First, the user defines a first predetermined value as a standard of the defective pixel, and second, identifies whether the number of pixels within the predetermined area with a pixel value that is greater than the first predetermined value is greater than a second predetermined value. When the first predetermined value and the second predetermined value are larger, this means that the condition for identifying the center pixel as the defective pixel is higher. Otherwise, when the first predetermined value and second predetermined value are smaller, that means it is easier to establish the defective pixel. For example, FIGS. 3A, 3B are schematic drawings of the defective pixel in accordance with an embodiment of the invention. FIG. 3A shows that the image has a pixel with a pixel value that is greater than the pixel values of the adjacent pixels, such as the slant line shown in FIG. 3A, and FIG. 3B shows the results after calculating the ratio value of the mean value $\bar{I}$ and the variance value $\sigma^2$. Then the third calculation module 150 determines whether the number of pixels with a pixel value greater than the first predetermined value (e.g., 100) within the predetermined area 305 is greater than the second predetermined value (e.g., 18). For example, as shown in FIG. 3B, the number of pixels with a pixel value greater than 100 is 24, which has satisfied the condition of the defective pixel, thus the third calculation module 150 identifies the pixel as a defective pixel. And then, the third calculation module 150 corrects the defective pixel using the conventional methods for obtaining a second correction image. After correcting the defective pixel, the output module 140 outputs a third correction image according to the first correction image and the second correction image.

Figure 4:
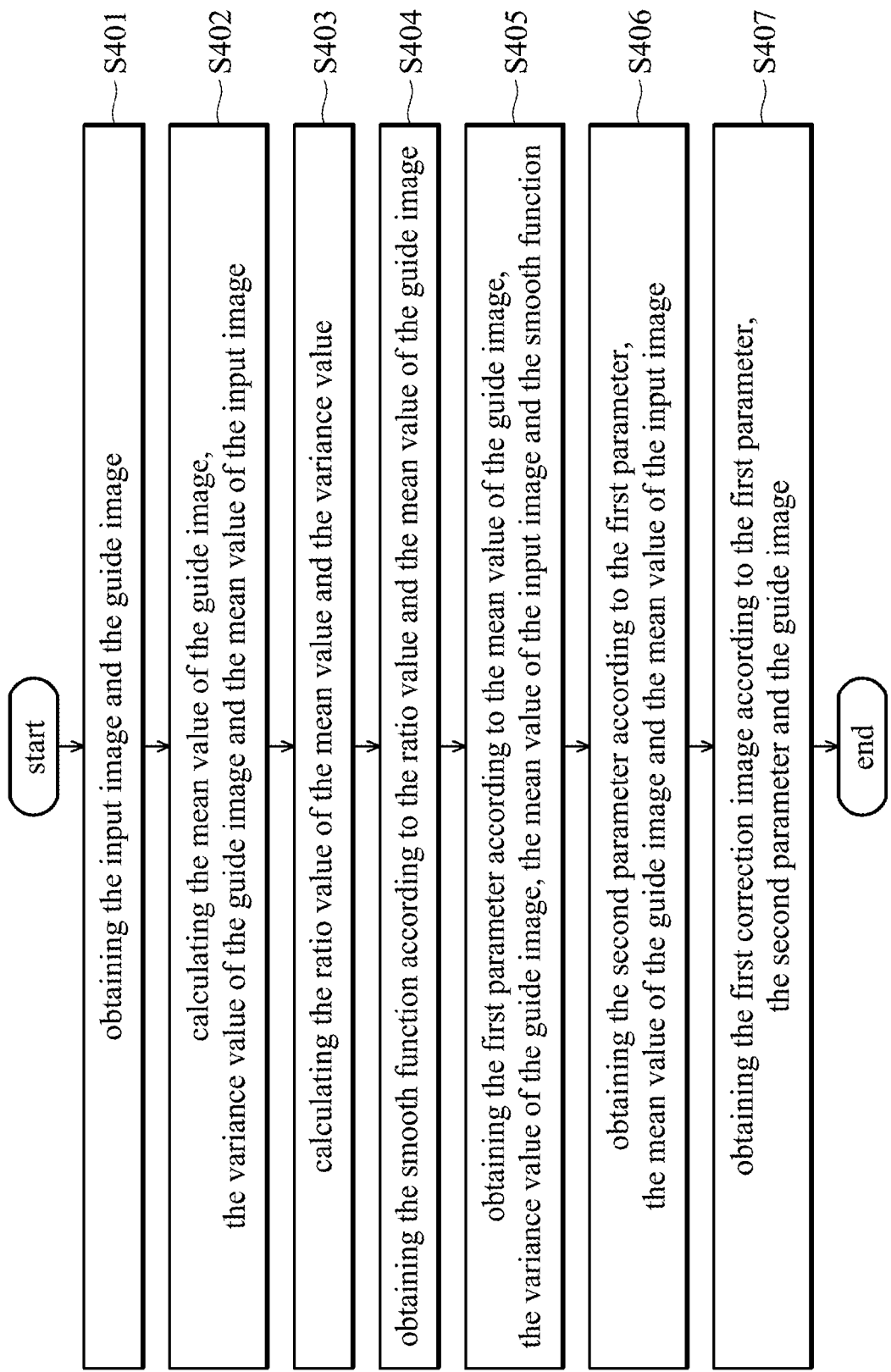
FIG. 4 is a flow chart of the image correction method in accordance with an embodiment of the invention.

Please refer to FIG. 4 with FIG. 1. FIG. 4 is a flow chart of the image correction method in accordance with an embodiment of the invention. In step S401, the image-capture module 110 obtains the input image and the guide image. The guide image can be a default image, a brighter input image which has more details than the input image, or the input image. In step S402, the first calculation module 120 calculates the mean value of the guide image, the variance value of the guide image and the mean value of the input image according to the guide image. In step S403, the second calculation module 130 calculates the ratio value of the mean value and the variance value according to the mean value of the guide image and the variance value of the guide image. In step S404, the first calculation module 120 obtains the smooth function according to the ratio value calculated by the second calculation module 130 and the mean value of the guide image. In step S405, the first calculation module 120 further obtains the first parameter according to the mean value of the guide image, the variance value of the guide image, the mean value of the input image and the smooth function. In step S406, the first calculation module 120 further obtains the second parameter according to the first parameter, the mean value of the guide image and the mean value of the input image. In step S407, the first calculation module 120 obtains the first correction image according to the first parameter, the second parameter and the guide image, and the output module 140 outputs the first correction image. It should be noted that the formulas for calculating the smooth function, the first parameter and the second parameter are the same as the formulas used in the image-correction system 100, thus they are not described herein.

According to another embodiment of the invention, after obtaining the ratio value of the mean value of the guide image and the variance value of the guide image, the third calculation module 150 further calculates the number of pixels within the predetermined area with a pixel value that is greater than a first predetermined value, and determines whether the number of pixels within the predetermined area is greater than the second predetermined value. When the number of pixels within the predetermined area is greater than the second predetermined value, the third calculation module 150 identifies the center pixel of the predetermined area as the defective pixel, corrects the input image, and obtains the second correction image. The output module 140 outputs the third correction image according to the first correction image and the second correction image.

As described above, the invention provides an image-correction system and an image correction method. The user only needs a simple calculation module for calculating the ratio value of the mean value and the variance value to adjust the blurriness of the smooth area and the dark area, remove the cross-talk of the bright area and further keep the details of the dark area. Moreover, due to the ratio value of the mean value and the variance value being difficult to affect by the gain of the pixels and the exposure, it can be used to determine whether the center pixel of the predetermined area is the defective pixel, and improve the accuracy of the determination.

It will be apparent to those skilled in the art that various modifications and variations can be made to the structure disclosed without departing from the scope or spirit of the invention. In view of the foregoing, it is intended that the present invention covers modifications and variations of this invention, provided they fall within the scope of the following claims and their equivalents.

What is claimed is:

1. An image-correction system, comprising:
   a camera, configured to obtain an input image and a guide image;
   a processor, configured to:
   obtain a smooth function according to a ratio value and a mean value of the guide image,
   obtain a first parameter according to the mean value of the guide image, a variance value of the guide image, a mean value of the input image and the smooth function,
   obtain a second parameter according to the first parameter, the mean value of the guide image and the mean value of the input image,
   obtain the ratio value of the mean value of the guide image and the variance value of the guide image according to the mean value of the guide image and the variance value of the guide image, and
   output the first correction image according to the first parameter and the second parameter.

2. The image-correction system as claimed in claim 1, wherein the processor further obtains the first parameter and the second parameter using the following formula:

$$a_k = \frac{\frac{1}{|w|}\sum_{i \in w_k} I_i p_i - \bar{I}_k \bar{p}_k}{\sigma_k^2 + f(k)}$$

$$b_k = \bar{p}_k - a_k \bar{I}_k$$

wherein, $a_k$ is the first parameter, $b_k$ is the second parameter, $w_k$ is a $k^{th}$ filtering window, $|w|$ is a number of pixels of the $k^{th}$ filtering window, $I_i$ is the $i^{th}$ pixel of the guide image I, $p_i$ is the $i^{th}$ pixel of the input image p, $\bar{I}_k$ is the mean value of the $k^{th}$ filtering window of the guide image I, $\bar{p}_k$ is the mean value of the $k^{th}$ filtering window of the input image p, $\sigma_k^2$ is the variance value of the $k^{th}$ filtering window of the guide image I, and $f(k)$ is the smooth function.

3. The image-correction system as claimed in claim 2, wherein the processor further obtains the smooth function using the following formula:

$$f(k) = \begin{cases} \left(c1 - h\left(\frac{\sigma_k^2}{\bar{I}_k}\right)\right) \times (c2 + q(\bar{I}_k)), & c1 \geq h\left(\frac{\sigma_k^2}{\bar{I}_k}\right) \\ 0, & c1 < h\left(\frac{\sigma_k^2}{\bar{I}_k}\right) \end{cases}$$

wherein, $f(k)$ is the smooth function, $$\frac{\sigma_k^2}{\bar{I}_k}$$

is the ratio value, $$h\left(\frac{\sigma_k^2}{\bar{I}_k}\right)$$

is a normal correlation function corresponding to the ratio value, $q(\bar{I}_k)$ is a normal correlation function corresponding to the mean value of the guide image I, c1 is a first constant, and c2 is a second constant.

4. The image-correction system as claimed in claim 3, wherein the processor further obtains the first correction image using the following formula:

$$q_i = a_k I_i + b_k$$

wherein, $q_i$ is the first correction image.

5. The image-correction system as claimed in claim 3, wherein the processor further determines whether a center pixel of a predetermined area is a defective pixel according to the ratio values of the mean value and the variance value of a plurality of pixels within the predetermined area.

6. The image-correction system as claimed in claim 5, wherein the processor further calculates a number of pixels within the predetermined area with a pixel value that is greater than a first predetermined value, and determines whether the number of pixels within the predetermined area is greater than a second predetermined value, and when the number of pixels within the predetermined area is greater than the second predetermined value, the processor also identifies the center pixel as the defective pixel, corrects the input image and outputs a second correction image.

7. The image-correction system as claimed in claim 6, wherein the processor further outputs a third correction image according to the first correction image and the second correction image.

8. An image correction method, comprising:
obtaining an input image and a guide image;
obtaining a ratio value of a mean value of the guide image and a variance value of the guide image according to the mean value of the guide image and the variance value of the guide image;
obtaining a smooth function according to the ratio value and the mean value of the guide image;
obtaining a first parameter according to the mean value of the guide image, the variance value of the guide image, a mean value of the input image and the smooth function;
obtaining a second parameter according to the first parameter, the mean value of the guide image and the mean value of the input image;
obtaining a first correction image according to a first parameter, a second parameter and the guide image.

9. The image correction method as claimed in claim 8, further comprising:
obtaining the first parameter and the second parameter using the following formula:

$$a_k = \frac{\frac{1}{|w|} \sum_{i \in w_k} I_i p_i - \bar{I}_k \bar{p}_k}{\sigma_k^2 + f(k)}$$

$$b_k = \bar{p}_k - a_k \bar{I}_k$$

wherein, $a_k$ is the first parameter, $b_k$ is the second parameter, $w_k$ is $k^{th}$ filtering window, $|w|$ is a number of pixels of the $k^{th}$ filtering window, $I_i$ is the $i^{th}$ pixel of the guide image I, $p_i$ is the $i^{th}$ pixel of the input image p, $\bar{I}_k$ is the mean value of the $k^{th}$ filtering window of the guide image I, $\bar{p}_k$ is the mean value of the $k^{th}$ filtering window of the input image p, $\sigma_k^2$ is the variance value of the $k^{th}$ filtering window of the guide image I, and $f(k)$ is the smooth function.

10. The image correction method as claimed in claim 9, further comprising:
obtaining the smooth function using the following formula:

$$f(k) = \begin{cases} \left(c1 - h\left(\frac{\sigma_k^2}{\bar{I}_k}\right)\right) \times (c2 + q(\bar{I}_k)), & c1 \geq h\left(\frac{\sigma_k^2}{\bar{I}_k}\right) \\ 0, & c1 < h\left(\frac{\sigma_k^2}{\bar{I}_k}\right) \end{cases}$$

wherein, $f(k)$ is the smooth function, $$\frac{\sigma_k^2}{\bar{I}_k}$$

is the ratio value, $$h\left(\frac{\sigma_k^2}{\bar{I}_k}\right)$$

is a normal correlation function corresponding to the ratio value, $q(\bar{I}_k)$ is a normal correlation function corresponding to the mean value of the guide image I, c1 is a first constant, and c2 is a second constant.

11. The image correction method as claimed in claim 10, further comprising:
obtaining the first correction image using the following formula:

$$q_i = a_k I_i + b_k$$

wherein, $q_i$ is the first correction image.

12. The image correction method as claimed in claim 10, further comprising:
determining whether a center pixel of a predetermined area is a defective pixel according to the ratio values of the mean value and the variance value of a plurality of pixels within the predetermined area.

13. The image correction method as claimed in claim 12, further comprising:

calculating number of pixels within the predetermined area with a pixel value that is greater than a first predetermined value;

determining whether the number of pixels within the predetermined area is greater than a second predetermined value; and identifying the center pixel as the defective pixel, correcting the input image, and outputting a second correction image when the number of pixels within the predetermined area is greater than the second predetermined value.

14. The image correction method as claimed in claim 13, further comprising:

outputting a third correction image according to the first correction image and the second correction image.

* * * * *